United States Patent
Park

(10) Patent No.: US 9,559,563 B2
(45) Date of Patent: Jan. 31, 2017

(54) MOTOR

(71) Applicant: LG INNOTEK CO., LTD., Seoul (KR)

(72) Inventor: Jae Hyun Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/475,832

(22) Filed: Sep. 3, 2014

(65) Prior Publication Data

US 2015/0061420 A1 Mar. 5, 2015

(30) Foreign Application Priority Data

Sep. 3, 2013 (KR) .................. 10-2013-0105476

(51) Int. Cl.
| | |
|---|---|
| H02K 5/24 | (2006.01) |
| H02K 3/34 | (2006.01) |
| H02K 3/38 | (2006.01) |
| H02K 3/32 | (2006.01) |
| H02K 5/173 | (2006.01) |

(52) U.S. Cl.
CPC ............ H02K 5/24 (2013.01); H02K 3/345 (2013.01); H02K 3/38 (2013.01); H02K 3/325 (2013.01); H02K 5/1732 (2013.01); H02K 2203/12 (2013.01)

(58) Field of Classification Search
CPC .................................. H02K 5/24; H02K 3/345
USPC ..................................................... 310/89, 194
See application file for complete search history.

(56) References Cited

U.S. PATENT DOCUMENTS

| | | | |
|---|---|---|---|
| 6,462,907 B1* | 10/2002 | Masuzawa .............. | H02K 1/14 360/133 |
| 2006/0220481 A1* | 10/2006 | Takekawa ................. | 310/90.5 |
| 2009/0026857 A1* | 1/2009 | Lavall ..................... | H02K 5/20 310/58 |
| 2011/0198948 A1* | 8/2011 | Keisuke et al. ................. | 310/25 |

FOREIGN PATENT DOCUMENTS

JP 06261528 * 9/1994 ............. H02K 37/04

* cited by examiner

*Primary Examiner* — Terrance Kenerly
(74) *Attorney, Agent, or Firm* — Ked & Associates LLP

(57) ABSTRACT

A motor includes a housing having a ring-shaped protruding portion protruding from a lower surface thereof. A stator core is fixed to an inner circumferential surface of the housing and on which a coil is wound, and an insulator is provided between the stator core and the coil. A lower end of the insulator is in contact with the protruding portion. Vibration and noise generated from the housing may be reduced without changing a material or a thickness of the housing.

16 Claims, 5 Drawing Sheets

(a)

MOTOR

CROSS-REFERENCE TO RELATED APPLICATION(S)

This application claims priority under 35 U.S.C. §119 to Korean Application No. 10-2013-0105476 filed on Sep. 3, 2013, whose entire disclosure is hereby incorporated by reference.

BACKGROUND

1. Field

The present application relates to a motor.

2. Background

Generally, an Electronic Power Steering (EPS) System is a device for securing steering stability of a vehicle, and functions to provide a torque in a steering direction of a driver using a motor and thus to allow easy handling. Unlike an existing hydraulic power steering (HPS) system, the EPS system can control an operation of the motor according to driving conditions, and thus can enhance steering performance and steering feeling.

In the EPS system, an electronic control unit (ECU) drives the motor according to the driving conditions detected by a vehicle speed sensor, a torque angle sensor, a torque sensor, and the like, secures turning stability, provides rapid resilience, and thus enables a driver to safely drive a vehicle. The motor used in the EPS system has a cylindrical shape, and an exterior thereof is formed by a housing of which an upper portion is opened and a bracket coupled to the upper portion of the housing, and a stator is disposed in the housing.

A rotator rotated according to an electromagnetic interaction with the stator is disposed at a center of the stator. The rotor is rotatably supported by a rotational shaft. A vehicle steering shaft is connected to an upper portion of the rotational shaft to provide power to assist a steering operation.

The motor generates vibration and noise at a high frequency area, and this phenomenon is associated with a resonant frequency. Therefore, there is a need to shift or improve the resonant frequency, thereby reducing the vibration and the noise. A material of the housing may be changed from iron to aluminum, or a thickness of the housing may be adjusted. However, there is a problem in that material costs and manufacturing costs are increased.

BRIEF DESCRIPTION OF THE DRAWINGS

The embodiments will be described in detail with reference to the following drawings in which like reference numerals refer to like elements wherein.

DETAILED DESCRIPTION

It is to be noted that, in this specification, the expression that "a certain construction element is connected to another construction element" means that the certain construction element is directly connected to another construction element, and also means that a third construction element may be interposed therebetween. On the other hand, the expression that "the certain construction element is directly connected to another construction element" means that the third construction element is not interposed therebetween.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined here.

Figure 1:
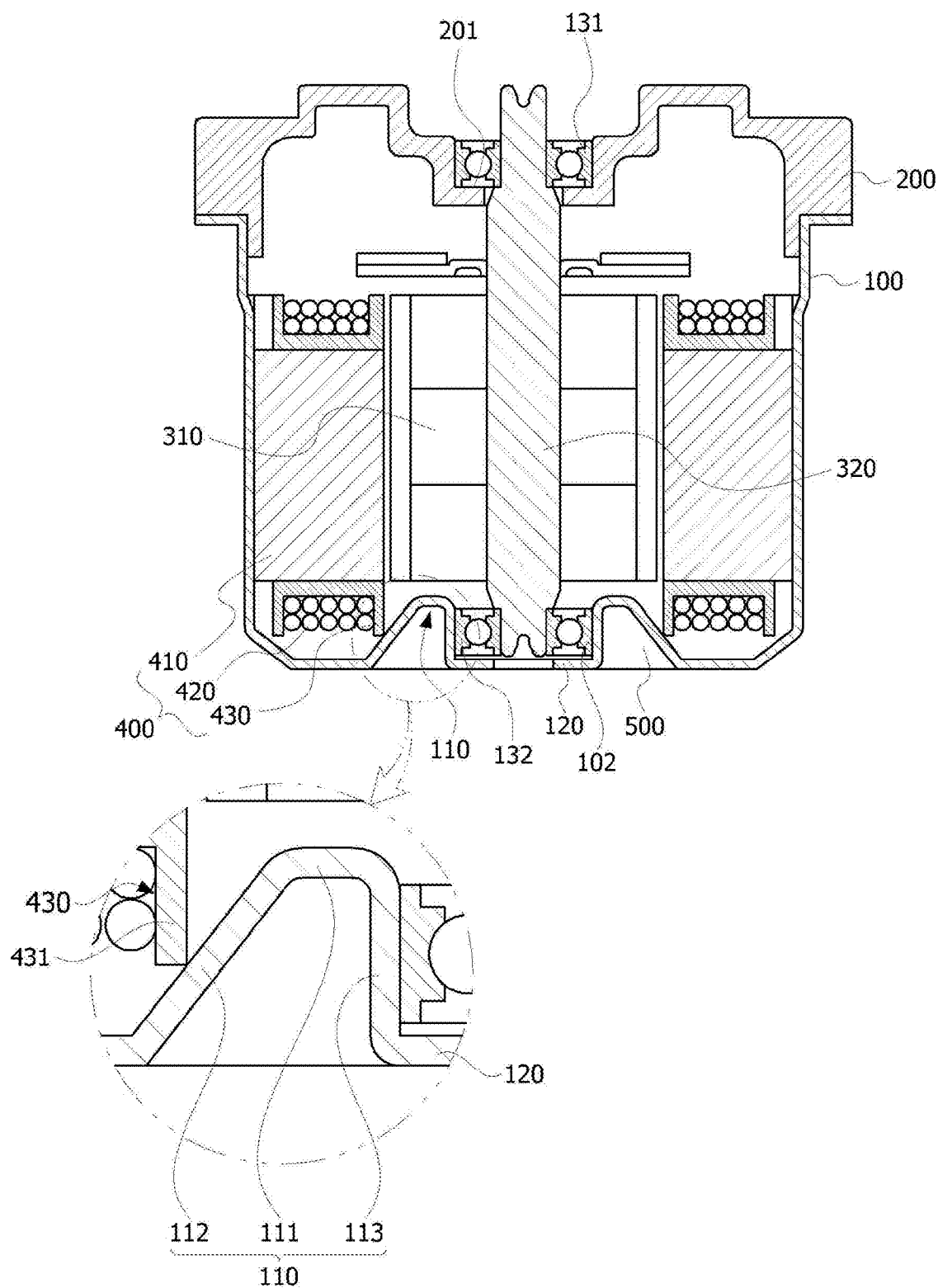
FIG. 1 is a cross-sectional view illustrating a motor according to one embodiment of the present application.
Figure 2:
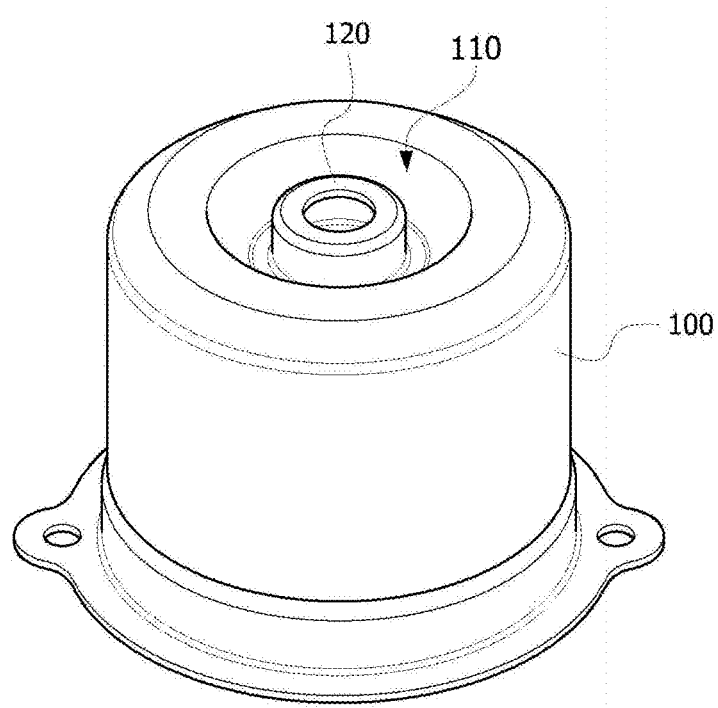
FIG. 2 is a bottom perspective view illustrating a housing of the motor according to one embodiment of the present application.
Figure 3:
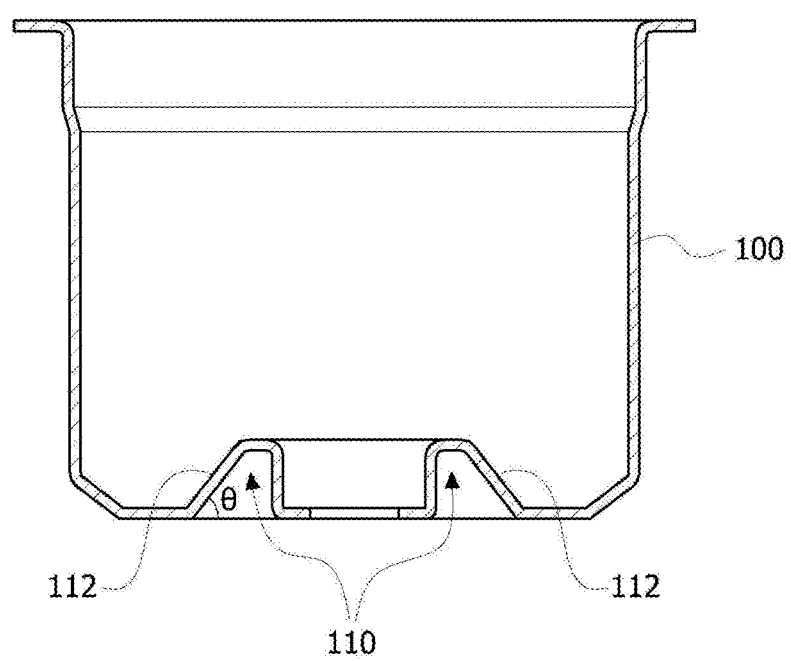
FIG. 3 is a side cross-sectional view illustrating the housing of the motor according to one embodiment of the present application.

FIG. 1 is a cross-sectional view illustrating a motor according to one embodiment of the present application, FIG. 2 is a bottom perspective view illustrating a housing of the motor according to one embodiment of the present application, and FIG. 3 is a side cross-sectional view illustrating the housing of the motor according to one embodiment of the present application.

Referring to FIGS. 1 to 3, the motor according to one embodiment of the present application includes a housing 100, a bracket 200 coupled to an upper portion of the housing 100, a rotational shaft 320 supported by the housing 100 and the bracket 200, a stator 400 coupled to an inner circumferential surface of the housing 100, a rotor 310 coupled to an outer circumferential surface of the rotational shaft 320, and an upper bearing 131 and a lower bearing 132 which support the rotational shaft 320. The motor may be used for an Electronic Power Steering (EPS) System.

The housing 100 has a cylindrical shape of which an upper portion is opened. A ring-shaped protruding portion 110 is formed at a lower surface 120 of the housing 100, and a lower bearing pocket portion 102 in which the lower bearing 132 is installed is formed by the protruding portion 110. The annular protruding portion 110 may be formed by pressing the lower surface of the housing 100 using a pressing member.

The bracket 200 is coupled to an upper portion of the housing 100, and has an upper bearing pocket portion 201 in which the upper bearing 131 is installed. The upper and lower bearings 131 and 132 are installed in the upper and lower bearing pocket portions 201 and 102 in a fitting manner so as to respectively support the rotational shaft 320 at upper and lower sides of the rotational shaft 320.

The stator 400 includes a stator core 410, a coil 420, and an insulator 430. The stator core 410 has a plurality of teeth which protrude toward a center, and the coil 420 is wound on each tooth. The insulator 430 is disposed between the stator core 410 and the coil 420 to insulate the coil 420 from the stator core 410. The rotor 310 is disposed to be rotatable together with the stator 400, and a plurality of magnets are installed at an outer circumferential surface of the rotor 310.

The rotational shaft 320 is disposed at a center of the housing 100 and the bracket 200 to be interlocked and rotated with the rotor 310. The rotational shaft 320 is rotatably supported by the upper bearing 131 installed at the bracket 200 and the lower bearing 132 installed at the lower surface of the housing 100. The insulator 430 is in contact with the protruding portion 110 formed to protrude inside the housing 100. The protruding portion 110 includes a first inclined surface 112 which protrudes inside the housing 100 to be in contact with the insulator 430, a second inclined surface 113 which supports the lower bearing 132, and a bottom surface 111 which connects the first inclined surface 112 with the second inclined surface 113.

If an end 431 of the insulator 430 is supported by the first inclined surface 112 of the protruding portion 110, it is possible to shift or improve a resonant frequency of the housing 100, and thus to reduce vibration and noise generated from the housing 100.

The second inclined surface 113 of the protruding portion 110 may be disposed vertically to the lower surface 120 of the housing 100 in order to form the lower bearing pocket portion 102 in which the lower bearing 132 is installed. An inclination angle of the first inclined surface 112 may be adjusted to be directly in contact with the second inclined surface 113. At this time, the bottom surface 111 may be omitted.

A reinforcing member 500 may be disposed in a space defined at a lower side of the housing 100 by the protruding portion 110. The reinforcing member 500 may be formed by filling the space with a rubber material or a resin. However, a kind and a material of the reinforcing member 500 are not specially limited.

As illustrated in FIG. 3, the first inclined surface 112 of the protruding portion 110 may be formed to have a predetermined slope 8 with respect to the lower surface 120 of the housing 100. For example, the predetermined slope 8 between the first inclined surface 112 and the lower surface 120 may be equal to or greater than 20° and less than 90°. Respectively, the predetermined slope 8 may be greater than 40° and less than 80°. When the insulator 430 is supported by the first inclined surface 112 of the protruding portion 110 in contact with the insulator 430, a stress applied to the insulator 430 may be dispersed, and thus the insulator 430 may be prevented from being damaged.

Figure 4:
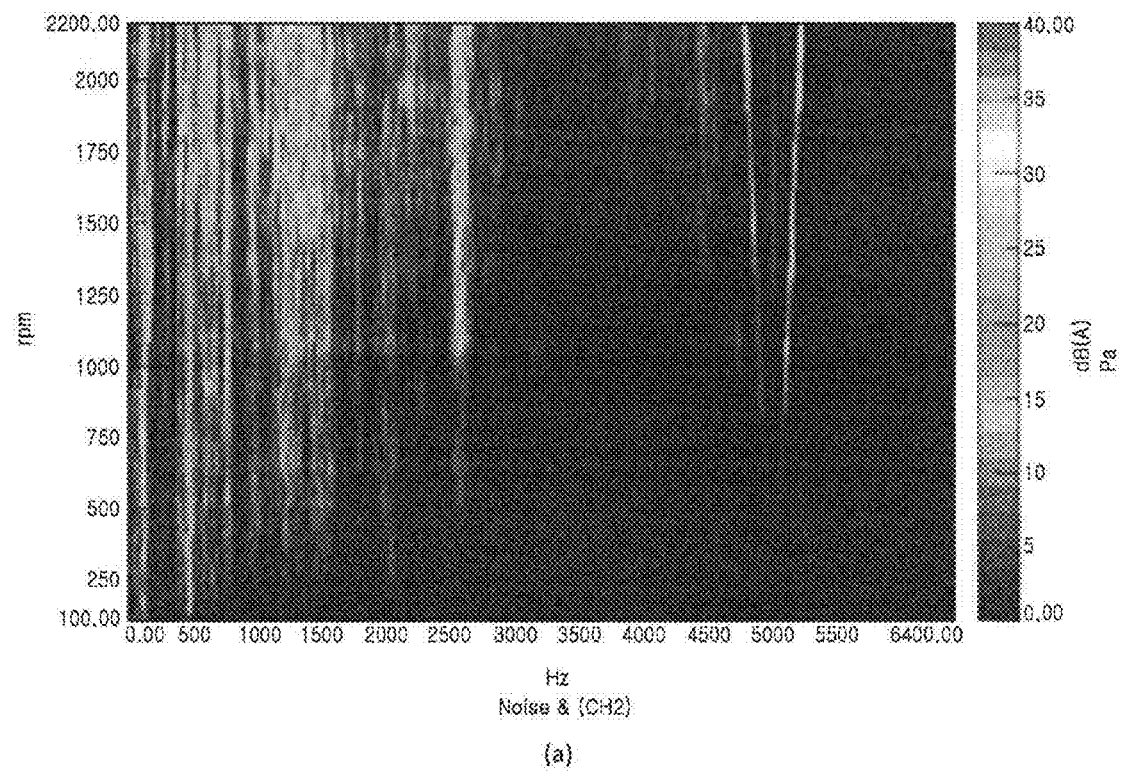
FIG. 4 is a view illustrating noise measurement results of the motor according to one embodiment of the present application.
Figure 4:
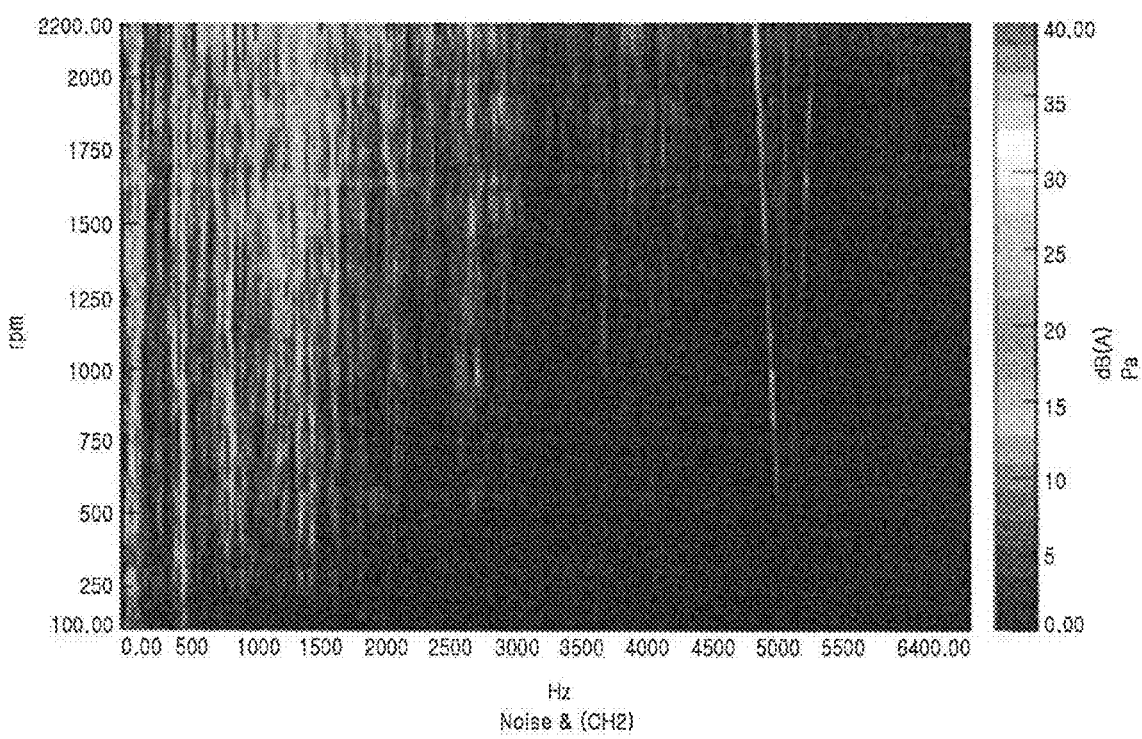

FIG. 4 is a view illustrating noise measurement results of the motor according to one embodiment of the present application. In the following Table 1, the noise measurement results of the motor according to one embodiment of the present application are compared with those in a conventional manner.

TABLE 1

| Frequency band | Operating noise (dB) | |
|---|---|---|
| | Before improvement | After improvement |
| High frequency band (2.5~3.5 kHz) | 38.3 | 25.7 |
| Entire band | 41.7 | 40.7 |

Before the improvement, as illustrated in FIG. 4A, it may be understood that the noise due to the resonant frequency is generated at a frequency area of 2.5 kHz. However, after the improvement, as illustrated in FIG. 4B, it may be understood that the resonant frequency is improved, and thus the noise is reduced.

Further, referring to Table 1, it may be also understood that the noise generated from the housing 100 is reduced at a high frequency band of 2.5 to 3.5 kHz by 10 dB or more.

Figure 5:
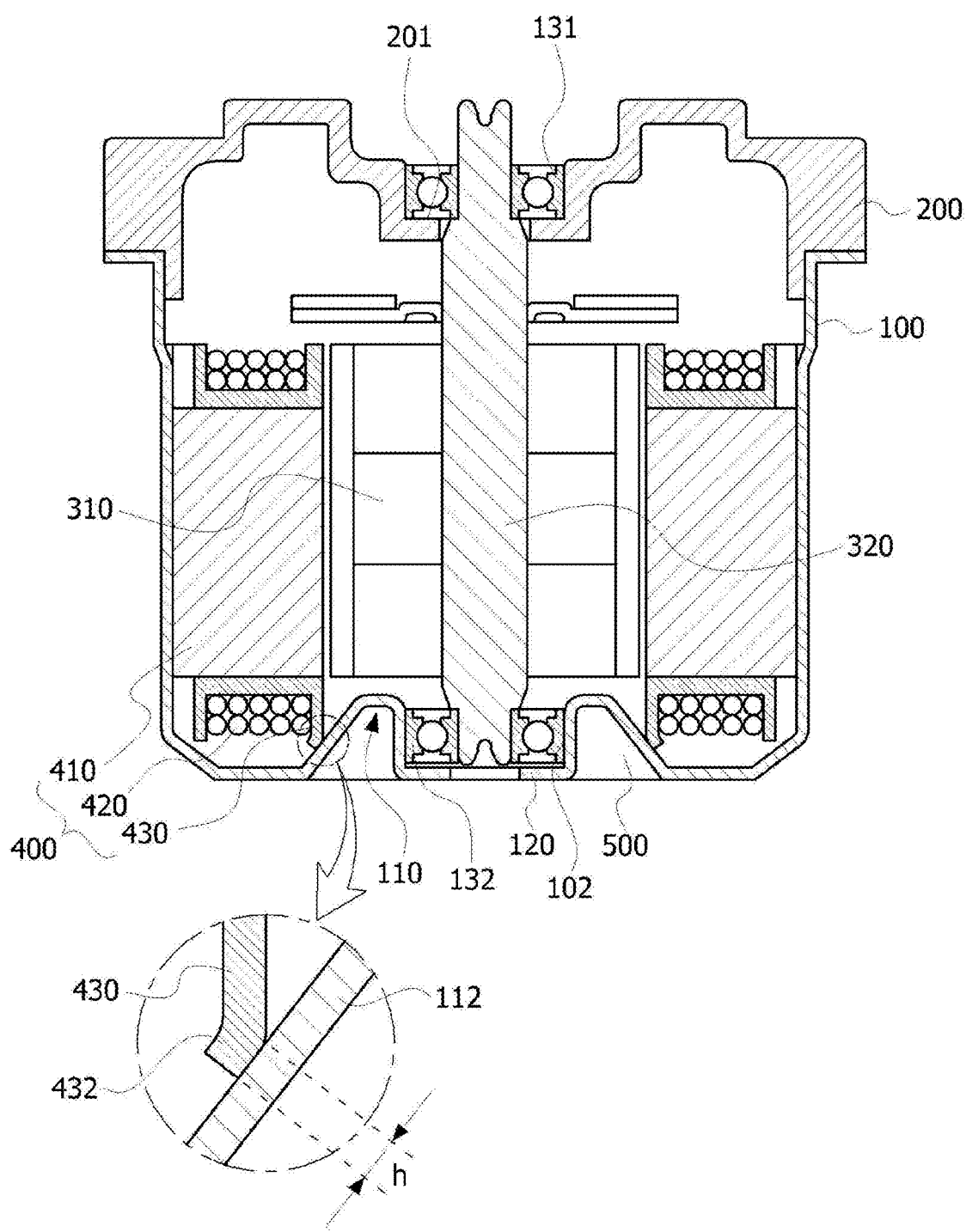
FIG. 5 is a cross-sectional view illustrating a motor according to another embodiment of the present application.

FIG. 5 is a cross-sectional view illustrating a motor according to another embodiment of the present application.

As illustrated in FIG. 5, the insulator 430 includes an end 432 which is bent and in contact with the first inclined surface 112 of the protruding portion 110. The end 432 may be formed to be bent by pressing a distal end of the insulator 430 to the protruding portion 110.

At this time, a ratio of a height (a contacting length: h) of the bent end 432 and a thickness of the housing 100 may be 1:8 to 1:20. For example, if the thickness t of the housing 100 is 1.6 mm, the height h of the bent portion may be 0.08 to 0.2 mm.

When the lower end of the insulator 430 is bent, the insulator 430 may support the housing 100 with a more potent force, and thus the vibration and the noise generated from the housing 100 may be further reduced.

Figure 6:
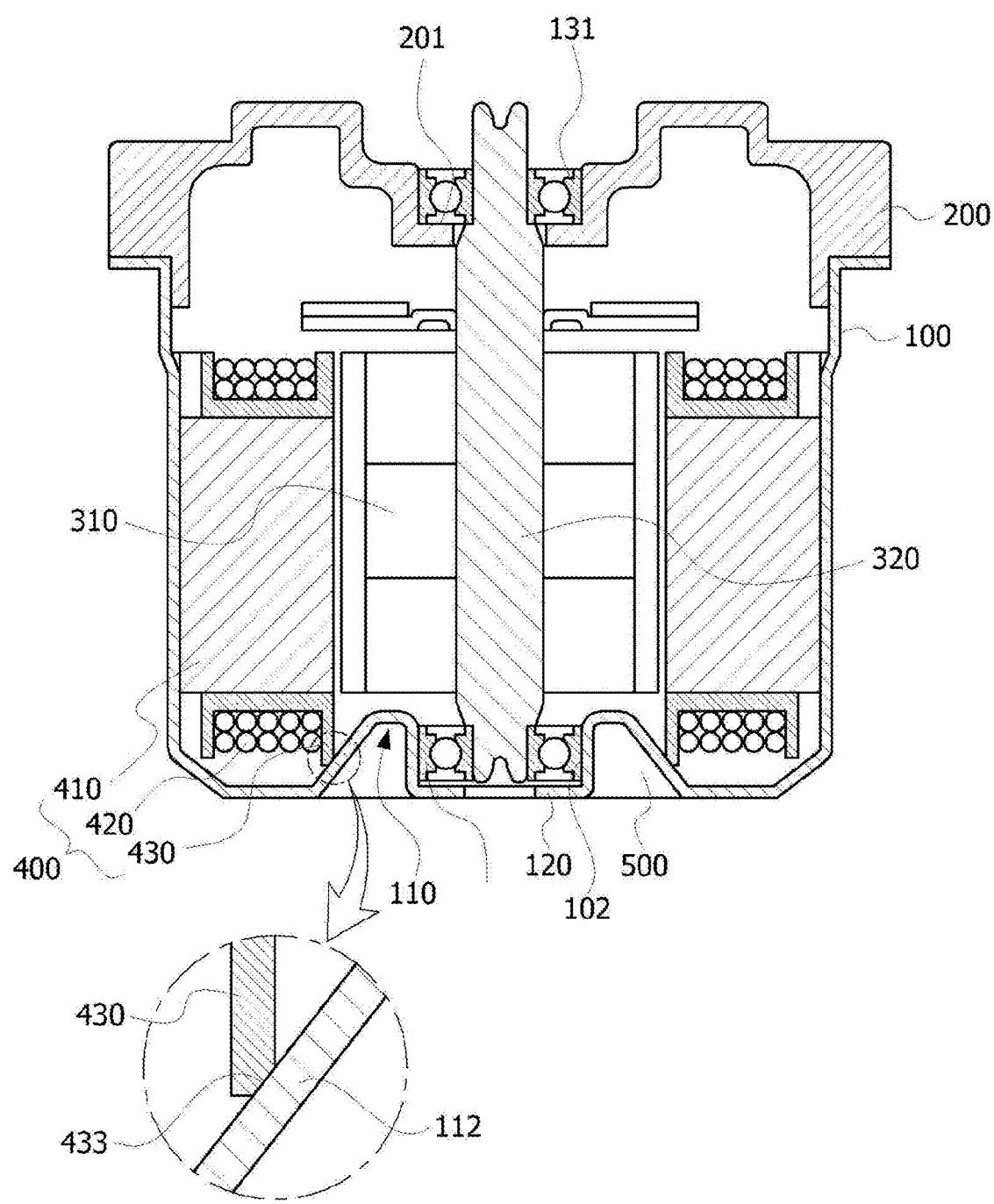
FIG. 6 is a cross-sectional view illustrating a motor according to still another embodiment of the present application.

FIG. 6 is a cross-sectional view illustrating a motor according to still another embodiment of the present application. As illustrated in FIG. 6, the insulator 430 includes an inclined contacting surface 433 which is in contact with the first inclined surface 112 of the protruding portion 110. The inclined contacting surface 433 may have a slope corresponding to the slope 8 of the first inclined surface 112.

According to the embodiment, a contact area between a lower end of the insulator 430 and an outer circumferential surface of the protruding portion 110 may be increased, and thus the housing 100 may be more stably supported.

According to the embodiment of the present application, since the insulator is in contact with the lower surface of the housing, the vibration and the noise generated from the housing can be reduced without changing the material and the thickness of the housing.

Further, according to the embodiment of the present application, since the predetermined slope is provided at the lower surface of the housing, which is in contact with the insulator, to disperse the stress applied to the insulator, the insulator can be prevent from being damaged.

It will be apparent to those skilled in the art that various modifications can be made to the above-described exemplary embodiments of the present application without departing from the spirit or scope of the invention. Thus, it is intended that the present application covers all such modifications provided they come within the scope of the appended claims and their equivalents.

The present application is directed to a motor capable of reducing vibration and noise generated from a housing without changing a material or a thickness of the housing.

According to an aspect of the present application, there is provided a motor including: a housing having a protruding portion; a stator including a stator core disposed at an inner circumferential surface of the housing, a coil wound on the stator core, and an insulator disposed between the stator core and the coil; a rotor disposed to be rotatable together with the stator; and a rotational shaft interlocked and rotated with the rotor, wherein the protruding portion includes an inclined surface in contact with the insulator.

The protruding portion may include a first inclined surface configured to protrude inside the housing to be in contact with the insulator, and a second inclined surface connected with the first inclined surface.

The second inclined surface may support a bearing configured to support the rotational shaft.

The motor may further include a bottom surface configured to connect the first inclined surface with the second inclined surface.

The motor may further include a reinforcing member arranged in a space defined by the first inclined surface, the second inclined surface, and the bottom surface.

The insulator may include an end bent to be in contact with the inclined surface of the protruding portion.

The insulator may include an inclined contacting surface configured to be in contact with the inclined surface of the protruding portion.

A ratio of a height of the end of the insulator and a thickness of the housing may be 1:8 to 1:20.

According to another aspect of the present application, there is provided a motor including: a housing; a stator including a stator core disposed at an inner circumferential surface of the housing, a coil wound on the stator core, and an insulator disposed between the stator core and the coil; a rotor disposed to be rotatable together with the stator; and a rotational shaft interlocked and rotated with the rotor, wherein an operating noise is 30 dB or less at a frequency band of 2.5 to 3.5 kHz.

According to still another aspect of the present application, there is provided a motor including: a housing having a protruding portion; a stator including a stator core disposed at an inner circumferential surface of the housing, a coil wound on the stator core, and an insulator disposed between the stator core and the coil; a rotor disposed to be rotatable together with the stator; and a rotational shaft interlocked and rotated with the rotor, wherein the protruding portion includes a first inclined surface configured to protrude inside the housing to be in contact with the insulator, and a second inclined surface configured to support a bearing configured to support the rotational shaft.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor comprising:
   a housing having a recess protruding into an inner space of the housing;
   a stator including a stator core provided at an inner circumferential surface of the housing, a coil wound on the stator core, and an insulator provided between the stator core and the coil;
   a rotor provided in the housing; and
   a rotational shaft configured to rotate with the rotor, wherein the recess includes a first inclined surface, and wherein the insulator includes an end portion which is bent along the first inclined surface of the recess to reduce vibration or noise of the motor, wherein the end portion protrudes in an axial direction with respect to the coil wound on the insulator, wherein the insulator includes a "U" shape including first and second legs, wherein the first leg includes the end portion and extends towards the housing at least as far as the second leg extends, and wherein the housing is made of steel.

2. The motor of claim 1, wherein the recess surrounds the rotational shaft.

3. The motor of claim 1, wherein the recess includes:
   the first inclined surface protruding into the inner space to be in contact with the insulator and forming a first sidewall of the recess; and
   a second inclined surface protruding into the inner space and forming a second sidewall of the recess.

4. The motor of claim 3, wherein the second inclined surface supports a bearing configured to support the rotational shaft.

5. The motor of claim 3, wherein the recess further includes a bottom surface configured to connect the first inclined surface with the second inclined surface.

6. The motor of claim 5, further comprising a reinforcing member provided in a space on an outer surface of the housing defined by the first inclined surface, the second inclined surface, and the bottom surface.

7. The motor of claim 1, wherein the insulator includes an inclined contacting surface configured to be in contact with the inclined surface of the recess.

8. The motor of claim 1, wherein a ratio of a height of the end of the insulator and a thickness of the housing is 1:8 to 1:20.

9. A motor comprising:
   a housing having a recess protruding into an inner space of the housing;
   a stator including a stator core provided at an inner circumferential surface of the housing, a coil wound on the stator core, and an insulator provided between the stator core and the coil;
   a rotor provided in the housing; and
   a rotational shaft configured to rotate with the rotor, wherein the recess includes a first inclined surface, and wherein an end portion of the insulator includes an Inclined contacting surface having a slope corresponding to the slope of the inclined surface of the recess to reduce vibration or noise of the motor, wherein the end portion protrudes in an axial direction with respect to the coil wound on the insulator, wherein the insulator includes a "U" shape including first and second legs, wherein the first leg includes the end portion and extends towards the housing at least as far as the second leg extends, and wherein the housing is made of steel.

10. The motor of claim 9, wherein the housing includes a protruding portion configured to be in contact with the insulator.

11. The motor of claim 10, wherein the protruding portion includes:
    a first inclined surface configured to protrude inside the housing to be in contact with the insulator; and
    a second inclined surface connected with the first inclined surface.

12. The motor of claim 11, wherein the protruding portion includes a bottom surface configured to connect the first inclined surface with the second inclined surface.

13. The motor of claim 12, further comprising a reinforcing member arranged in a space defined by the first inclined surface, the second inclined surface, and the bottom surface.

14. The motor of claim 10, wherein the insulator includes an end bent to be in contact with the inclined surface of the protruding portion.

15. The motor of claim 14, wherein a ratio of a height of the end of the insulator and a thickness of the housing is 1:8 to 1:20.

16. The motor of claim 10, wherein an operating noise is 30 dB or less at a frequency band of 2.5 to 3.5 kHz.

* * * * *